(12) United States Patent
Klages et al.

(10) Patent No.: US 8,578,965 B2
(45) Date of Patent: Nov. 12, 2013

(54) DEVICE AND METHOD FOR SUPPLYING A SORBENT

(75) Inventors: Steven S. Klages, Cambridge (CA); C. Malcolm MacKenzie, Guelph (CA); Xiaojie Zhang, Guelph (CA)

(73) Assignee: Babcock & Wilcox Canada Ltd., Cambridge, Ontario (CA)

( * ) Notice: Subject to any disclaimer, the term of this patent is extended or adjusted under 35 U.S.C. 154(b) by 354 days.

(21) Appl. No.: 13/208,000

(22) Filed: Aug. 11, 2011

(65) Prior Publication Data

US 2012/0042970 A1 Feb. 23, 2012

Related U.S. Application Data

(60) Provisional application No. 61/374,547, filed on Aug. 17, 2010.

(51) Int. Cl.
*F23J 7/00* (2006.01)
*F23J 15/00* (2006.01)
*F16L 41/00* (2006.01)

(52) U.S. Cl.
USPC ............ 137/561 A; 239/416.5; 110/345; 110/347

(58) Field of Classification Search
USPC .......... 137/561 A; 239/271, 272, 416.5, 422; 110/362, 345, 347
See application file for complete search history.

(56) References Cited

U.S. PATENT DOCUMENTS

| | | | | | |
|---|---|---|---|---|---|
| 2,126,364 | A | * | 8/1938 | Ernst | 137/561 A |
| 3,292,868 | A | * | 12/1966 | McCartney et al. | 239/422 |
| 3,889,933 | A | * | 6/1975 | Jaquay | 239/422 |
| 4,284,243 | A | * | 8/1981 | Shaner | 137/561 A |
| 4,348,170 | A | * | 9/1982 | Vatsky et al. | 239/416.5 |
| 4,421,039 | A | * | 12/1983 | Llinares, Jr. | 239/416.4 |
| 4,493,636 | A | * | 1/1985 | Haldipur et al. | 239/422 |
| 4,555,994 | A | * | 12/1985 | Voigt et al. | 110/347 |
| 4,722,287 | A | * | 2/1988 | Anderson et al. | 110/263 |
| 5,074,226 | A | * | 12/1991 | Lynch | 110/345 |
| 7,255,123 | B2 | * | 8/2007 | Cedergaard et al. | 137/561 A |
| 2003/0230644 | A1 | * | 12/2003 | Marin et al. | 239/416.5 |
| 2010/0263577 | A1 | * | 10/2010 | Nijhawan | 110/345 |

* cited by examiner

*Primary Examiner* — John Rivell
(74) *Attorney, Agent, or Firm* — Eric Marich (57) ABSTRACT

The present invention relates generally to a device and method for supplying a sorbent, at one or more various desired supply points in a flue gas stream, to boilers, heaters, kilns, or other flue gas-, or combustion gas-, generating devices (e.g., those located at power plants, processing plants, etc.). In one embodiment, the device of the present invention that is designed to supply a sorbent comprises a series of coaxial pipes. In another embodiment, the device of the present invention that is designed to supply a sorbent comprises a mixing section with a plurality of distribution vanes contained in at least one mixing section.

31 Claims, 7 Drawing Sheets

DEVICE AND METHOD FOR SUPPLYING A SORBENT

RELATED APPLICATION DATA

This patent application claims priority to U.S. Provisional Patent Application No. 61/374,547 filed Aug. 17, 2010 and titled "Device and Method for Supplying a Sorbent." The complete text of this patent application is hereby incorporated by reference as though fully set forth herein in its entirety.

FIELD AND BACKGROUND OF THE INVENTION

1. Field of the Invention

The present invention relates generally to a device and method for supplying a sorbent, at one or more various desired supply points in a flue gas stream, to boilers, heaters, kilns, or other flue gas-, or combustion gas-, generating devices (e.g., those located at power plants, processing plants, etc.). In one embodiment, the device of the present invention that is designed to supply a sorbent comprises a series of coaxial pipes. In another embodiment, the device of the present invention that is designed to supply a sorbent comprises a mixing section with a plurality of distribution vanes contained in at least one mixing section.

2. Description of the Related Art

In the field of sorbent supply there have, to date, been three existing designs pertaining to the injection of sorbents into a gas stream. The first consists of an open pipe. This design allows for injection of sorbent at one particular point. Overall coverage is achieved by using lances of different lengths at several locations. The second consists of a pipe with a closed bottom and several holes along the axial length of the lance. The intent of this design is to inject sorbent at several locations simultaneously. This is not achievable as the sorbent particles typically bypass several of the holes and is largely injected at one elevation. Finally some designs incorporate a shaped surface at the outlet to aid in sorbent dispersion. These designs inject PAC at one location.

A review of publicly available information showed two existing designs pertaining to the distribution of powdered sorbent from a main feed pipe to several, separate distribution pipes. The first consists of a manifold with separate flanged connections. Computer modeling of this device showed that sorbent particles typically bypass several of the connections and largely are fed to a single connection. The second consists of a cylindrical device with multiple outlets. Computer modeling demonstrates this device can result in highly localized distribution. This device has a top inlet from the main feed pipe.

Given the above, a need exists for a device and method that provides sorbent to a gas stream in various design situations and which is reliable and controllable.

SUMMARY OF THE INVENTION

The present invention relates generally to a device and method for supplying a sorbent, at one or more various desired supply points in a flue gas stream, to boilers, heaters, kilns, or other flue gas-, or combustion gas-, generating devices (e.g., those located at power plants, processing plants, etc.). In one embodiment, the device of the present invention that is designed to supply a sorbent comprises a series of coaxial pipes. In another embodiment, the device of the present invention that is designed to supply a sorbent comprises a mixing section with a plurality of distribution vanes contained in at least one mixing section.

Accordingly, one aspect of the present invention is drawn to a sorbent supply system comprising: at least one sorbent supply manifold, each sorbent supply manifold comprising: a main body having a top and a bottom, the main body having a tapered end located at the bottom end of the main body; an inlet pipe, the inlet pipe being connected to the tapered end of the main body; an impact plate, the impact plate being located at the top end of the main body directly opposed to the tapered end of the main body and being designed to hold therein two or more distribution vanes; two or more distribution openings, the distribution openings being formed in the tapered end of the main body; and two or more distribution pipes, wherein one distribution pipe is connected in an air tight manner to a respective distribution opening, wherein the two or more distribution vanes of the impact plate are designed to separate and distribute powdered sorbent to at least one distribution opening and wherein the two or more distribution vanes and the two or more distribution openings are arranged in a staggered fashion, and at least two sorbent injection lance devices, each sorbent injection lance device comprising: an inner supply pipe; an outer supply pipe; and a sleeve pipe, wherein the lance device has a first end where one end of both the inner supply pipe and the outer supply pipe are flat and flush with one another and a second ends of the inner supply pipe and outer supply pipe that are angled and are located opposite the flats ends, wherein the angled end of the inner supply pipe extends beyond the angled end of the outer supply pipe, wherein the sleeve pipe has two flat ends with the first flat end of the sleeve pipe being located nearest to the flat ends of the inner and outer supply pipes, the first flat end having a flange for attaching the lance device to a surface, wherein the second flat end of the sleeve pipe is located nearest to the angled ends of the inner and outer supply pipes where the outer supply pipe extends beyond the second flat end of the sleeve pipe, wherein the inner supply pipe is has a smaller diameter than the outer supply pipe, which has a smaller diameter than the sleeve pipe, wherein the inner supply pipe is concentrically located within the outer supply pipe so as to create a first annular region between the external surface of the inner supply pipe and the interior surface of the outer supply pipe, wherein the outer supply pipe is concentrically located within the sleeve pipe so as to create a second annular region between the external surface of the outer supply pipe and the interior surface of the sleeve pipe, wherein at least one of the first or second annular regions are supplied with a powder sorbent, and wherein each of the at least two sorbent injection lance devices are in communication with one distribution opening in the at least one sorbent supply manifold.

In yet another aspect of the present invention, there is provided a sorbent supply manifold comprising: a main body having a top and a bottom, the main body having a tapered end located at the bottom end of the main body; an inlet pipe, the inlet pipe being connected to the tapered end of the main body; an impact plate, the impact plate being located at the top end of the main body directly opposed to the tapered end of the main body and being designed to hold therein two or more distribution vanes; two or more distribution openings, the distribution openings being formed in the tapered end of the main body; and two or more distribution pipes, wherein one distribution pipe is connected in an air tight manner to a respective distribution opening, wherein the two or more distribution vanes of the impact plate are designed to separate and distribute powdered sorbent to at least one distribution opening and wherein the two or more distribution vanes and the two or more distribution openings are arranged in a staggered fashion.

In yet another aspect of the present invention, there is provided a sorbent injection lance comprising: an inner supply pipe; an outer supply pipe; and a sleeve pipe, wherein the lance device has a first end where one end of both the inner supply pipe and the outer supply pipe are flat and flush with one another and a second ends of the inner supply pipe and outer supply pipe that are angled and are located opposite the flats ends, wherein the angled end of the inner supply pipe extends beyond the angled end of the outer supply pipe, wherein the sleeve pipe has two flat ends with the first flat end of the sleeve pipe being located nearest to the flat ends of the inner and outer supply pipes, the first flat end having a flange for attaching the lance device to a surface, wherein the second flat end of the sleeve pipe is located nearest to the angled ends of the inner and outer supply pipes where the outer supply pipe extends beyond the second flat end of the sleeve pipe, wherein the inner supply pipe is has a smaller diameter than the outer supply pipe, which has a smaller diameter than the sleeve pipe, wherein the inner supply pipe is concentrically located within the outer supply pipe so as to create a first annular region between the external surface of the inner supply pipe and the interior surface of the outer supply pipe, wherein the outer supply pipe is concentrically located within the sleeve pipe so as to create a second annular region between the external surface of the outer supply pipe and the interior surface of the sleeve pipe, and wherein at least one of the first or second annular regions are suitable for being supplied with a powder sorbent.

In yet another aspect of the present invention, there is provided a method of supplying a powdered sorbent to a boiler system, the method comprising the steps of: (A) supplying at least one sorbent supply manifold, each sorbent supply manifold comprising: a main body having a top and a bottom, the main body having a tapered end located at the bottom end of the main body; an inlet pipe, the inlet pipe being connected to the tapered end of the main body; an impact plate, the impact plate being located at the top end of the main body directly opposed to the tapered end of the main body and being designed to hold therein two or more distribution vanes; two or more distribution openings, the distribution openings being formed in the tapered end of the main body; and two or more distribution pipes, wherein one distribution pipe is connected in an air tight manner to a respective distribution opening, wherein the two or more distribution vanes of the impact plate are designed to separate and distribute powdered sorbent to at least one distribution opening and wherein the two or more distribution vanes and the two or more distribution openings are arranged in a staggered fashion; (B) supplying at least two sorbent injection lance devices, each sorbent injection lance device comprising: an inner supply pipe; an outer supply pipe; and a sleeve pipe, wherein the lance device has a first end where one end of both the inner supply pipe and the outer supply pipe are flat and flush with one another and a second ends of the inner supply pipe and outer supply pipe that are angled and are located opposite the flats ends, wherein the angled end of the inner supply pipe extends beyond the angled end of the outer supply pipe, wherein the sleeve pipe has two flat ends with the first flat end of the sleeve pipe being located nearest to the flat ends of the inner and outer supply pipes, the first flat end having a flange for attaching the lance device to a surface, wherein the second flat end of the sleeve pipe is located nearest to the angled ends of the inner and outer supply pipes where the outer supply pipe extends beyond the second flat end of the sleeve pipe, wherein the inner supply pipe is has a smaller diameter than the outer supply pipe, which has a smaller diameter than the sleeve pipe, wherein the inner supply pipe is concentrically located within the outer supply pipe so as to create a first annular region between the external surface of the inner supply pipe and the interior surface of the outer supply pipe, wherein the outer supply pipe is concentrically located within the sleeve pipe so as to create a second annular region between the external surface of the outer supply pipe and the interior surface of the sleeve pipe, wherein at least one of the first or second annular regions are supplied with a powder sorbent, and wherein the at least two sorbent injection lance devices are located in at an appropriate point in a boiler system such that the angled ends of the sorbent injection lance devices can supply at least one sorbent to a desired internal portion of the boiler system; (C) connecting the at least one sorbent supply manifold to the at least two sorbent injection lance devices, wherein each of the at least two sorbent injection lance devices are in communication with one distribution opening in the at least one sorbent supply manifold; and (D) supplying at least one powdered sorbent material to the at least one sorbent supply manifold such that the at least one sorbent supply manifold can supply at least one powdered sorbent to the at least two sorbent supply lance devices which in turn supply the at least one powdered sorbent to a desired internal portion of the boiler system.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

Although various dimensions are illustrated in FIGS. 1 through 14, the present invention is not limited thereto and, as such, these dimensions are merely exemplary in nature. Accordingly, the present invention is to be broadly construed within the scope of the various embodiments disclosed herein.

DESCRIPTION OF THE INVENTION

The present invention relates generally to a device and method for supplying a sorbent, at one or more various desired supply points in a flue gas stream, to boilers, heaters, kilns, or other flue gas-, or combustion gas-, generating devices (e.g., those located at power plants, processing plants, etc.). In one embodiment, the device of the present invention that is designed to supply a sorbent comprises a series of coaxial pipes. In another embodiment, the device of the present invention that is designed to supply a sorbent comprises a mixing section with a plurality of distribution vanes contained in at least one mixing section.

Figures 1, 2, 3:
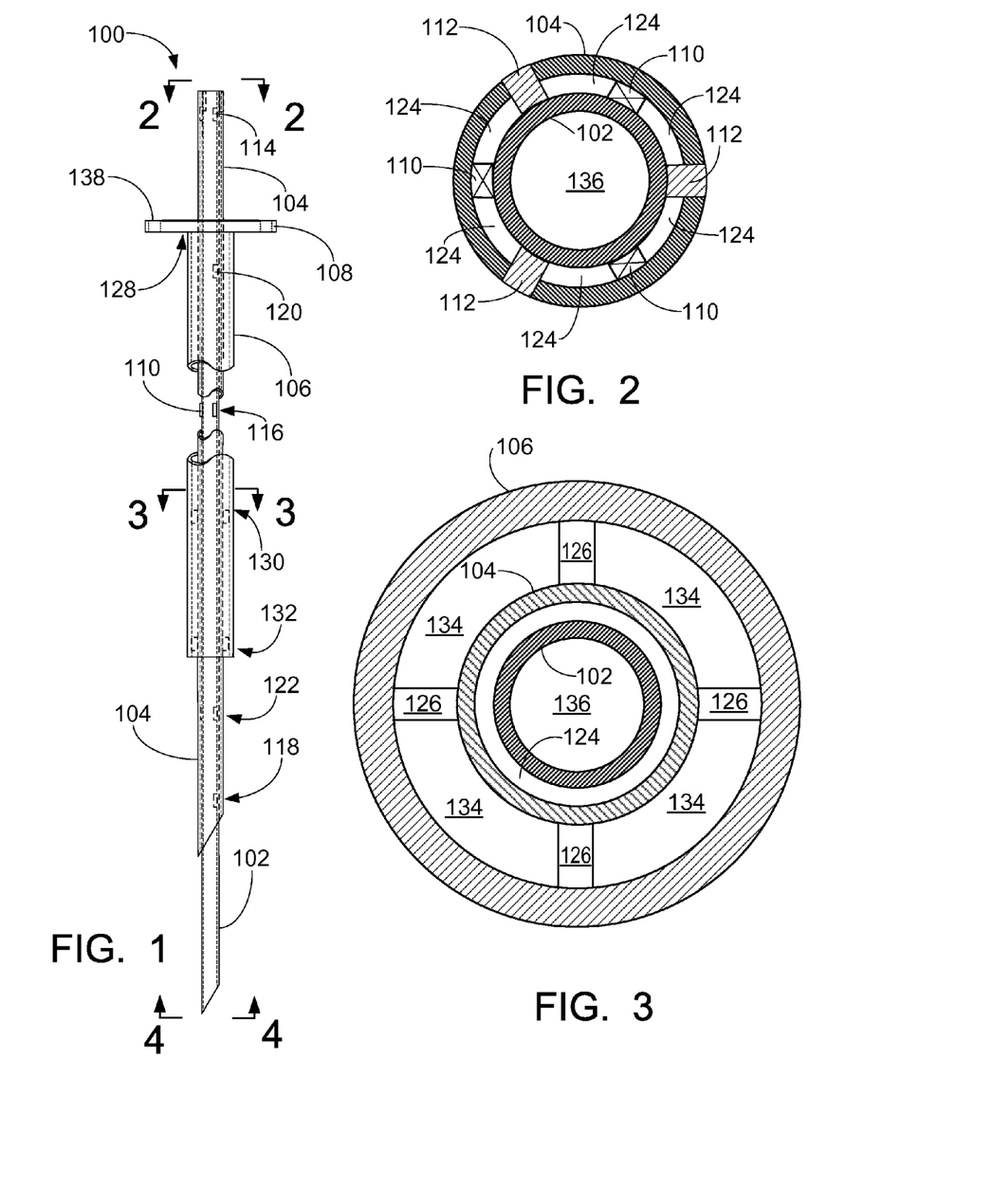
FIG. 1 is a cut-away side illustration of a device for supplying sorbent to a gas stream in accordance with one embodiment of the present invention.
FIG. 2 is a cross-sectional view of the device of FIG. 1 from the perspective of the 2-2 line of FIG. 1.
FIG. 3 is a cross-sectional view of the device of FIG. 1 from the perspective of the 3-3 line of FIG. 1.

Referring to the Figures where like reference numerals refer to like parts, and in particular to FIGS. 1 though 4, in one embodiment the device of the present invention comprises a series of coaxial pipes and is presented in FIG. 1. In this embodiment, the lance device 100 for supplying sorbent to a gas stream comprises a set of two or more concentrically disposed supply pipes 102 and 104 designed to receive powdered sorbent (e.g., powdered activated carbon (PAC)), and a sleeve pipe 106 with a flange 108 attached thereto for mounting the lance device 100 of FIG. 1 at an appropriate location in a boiler, heater, kiln, other flue gas-, or combustion gas-, generating devices (e.g., those located at power plants, processing plants, etc.), or other similar devices where the delivery of powdered sorbent is desired. It should be noted that although the present invention is described in the context of supplying powdered activated carbon (PAC), it is not limited thereto. Rather, any powdered sorbent can be supplied by the lance device of the present invention.

Turning to FIG. 1, FIG. 1 is a cut-away side illustration of a device for supplying sorbent to a gas stream in accordance with one embodiment of the present invention. The sorbent supply lance device 100 of FIG. 1 comprises, in one embodiment, a set of three concentrically nested pipes—an inner supply pipe 102, an outer supply pipe 104, and a sleeve pipe 106. As illustrated in FIG. 1, sleeve pipe 106 is designed to allow for the positioning, mounting and/or attachment of sorbent supply lance device 100 in a boiler or other similar device. Additionally, in the embodiment of FIG. 1 inner supply pipe 102 is longer than an outer supply pipe 104, and outer supply pipe 104 is longer than sleeve pipe 106. Both inner supply pipe 102 and outer supply pipe 104 have angled inner ends (their bottoms in FIG. 1). In one embodiment, the angles of the ends of inner supply pipe 102 and outer supply pipe 104 are identical and are in the range of about 10 degrees to about 75 degrees (as measured from a line that runs parallel to the right edge of supply pipes 102 and 104). In another embodiment, the angles of the ends of inner supply pipe 102 and outer supply pipe 104 differ from each other and are independently in the range of about 10 degrees to about 75 degrees (as measured from a line that runs parallel to the right edge of supply pipes 102 and 104). In still another embodiment, the angles of bottom end of supply pipes 102 and 104 are either independently or identically selected to be in the range of about 15 degrees to about 70 degrees, or from about 20 degrees to about 65 degrees, or from about 25 degrees to about 60 degrees, or from about 30 degrees to about 55 degrees, or from about 35 degrees to about 50 degrees, or even from about 40 degrees to about 45 degrees (as measured from a line that runs parallel to the right edge of supply pipes 102 and 104). Here, as well as elsewhere in the specification and claims, individual numerical values, or limits, from one or more embodiments can be combined to form additional non-disclosed and/or non-stated ranges. In still another embodiment, the angles of bottom end of supply pipes 102 and 104 are both selected to be about 30 degrees (as measured from a line that runs parallel to the right edge of supply pipes 102 and 104). As can be seen from FIG. 1, sleeve pipe 106 has a non-angled end.

Although not limited thereto, in one embodiment the positioning, mounting and/or attachment of sorbent supply lance device 100 to a suitable position of boiler is accomplished by creating a suitable opening at one or more points in a boiler wall, casing and/or flue and then inserting one or more sorbent supply lance devices 100 of the present invention there through. In one embodiment, securing the one or more sorbent supply lance devices 100 of the present invention is/are accomplished via sleeve pipe 106 that can, in one embodiment, contain a suitably sized flange 108 formed on one end thereof that permits the outer portion of a sorbent supply lance device 100 to be attached to the outer surface of a boiler wall, casing and/or flue. In one embodiment, flange 108 is formed of a material that is compatible with the material used for sleeve pipe 106. For example, if sleeve pipe 106 is formed from metal, a metal alloy, a coated metal, or a coated metal alloy, then flange 108 is formed from a metal or metal alloy. Although flange 108 can be chosen to be corrosion resistant based on the material from which it is formed, this is not absolutely necessary as flange 108 remains on the outer surface of a boiler wall, casing and/or flue. Thus, in one embodiment, flange 108 is formed from carbon steel and is welded using any appropriate welding technique to the top end of sleeve pip 106. As will be explained in detail below, attachment of flange 108 to the outer surface of a boiler wall, casing and/or flue can be accomplished via any suitable method (e.g., via welding).

Regarding the composition of inner supply pipe 102, outer supply pipe 104, and sleeve pipe 106, all of pipes 102, 104 and 106 are independently formed from a suitable metal, metal alloy, or ceramic compound that is corrosion resistant and heat resistant. Suitable metals and metal alloys include, but are not limited to, aluminum, titanium, steel, stainless steel, Inconel® coated steel, Inconel® coated stainless steel, or a combination of any two or more thereof. Suitable corrosion resistant and heat resistant ceramic compositions are known to those of skill in the art. As such, a detailed discussion herein is omitted for the sake of brevity. It should be noted that the composition of each pipe 102, 104 and 106 can be selected independently and as such all three pipes need not, in one embodiment, be formed from the same metal, metal alloy, or ceramic material. Further, the ceramic material may be employed as a protective liner or coating to the metal or metal alloy used in any embodiments of the lance devices described herein.

Regarding the remainder of the structure of a sorbent supply lance device 100 according to this embodiment, sorbent supply lance device 100 is formed by placing and/or mounting inner supply pipe 102 in the interior space of outer supply pipe 104 via any suitable method. One such method is achieved via a suitable number of mounting blocks 110 and chamfer bars 112. As can be seen in FIG. 2 (which is a cross-sectional views of FIG. 1 from the perspective of the 2-2 line), three mounting blocks 110 are placed on the outer surface of inner supply pipe 102 at 120 degree intervals and interspaced evenly between adjacent mounting blocks 110 is a chamfer bar 112. Accordingly, there are three chamfer bars 112 that are at 120 degree intervals respective to the other chamfer bars and interspaced evenly between adjacent mounting blocks 110. It should be noted that the present invention is not limited to three mounting blocks 110 and three chamfer bars 112. Rather, any suitable number of two or more mounting blocks 110 and two or more chamfer bars 112 can be independently utilized to securely position place inner supply pipe 102 in the interior space of outer supply pipe 104. In one embodiment, the combination of the mounting blocks 110 and the chamfer bars 112 described above are utilized only on the external end of sorbent supply lance device 100 (the top end in FIG. 1). In another embodiment, the combination of mounting blocks 110 and chamfer bars 112 described above are utilized at three or more points along the internal length of outer supply pipe 104. In this embodiment, the placement of the minimum of three sets of mounting blocks 110 and chamfer bars 112 are, utilizing the layout of FIG. 1, at the internal top end of outer supply pipe 104 (point 114 of FIG. 1), at the internal bottom end of outer supply pipe 104 (point 118 of FIG. 1), and at internal midpoint of outer supply pipe 104 (point 116 of FIG. 1). In another embodiment, the placement of a minimum of four, or five, or six, or even seven or more sets of mounting blocks 110 and chamfer bars 112 are utilized with the caveat that at least one set is place at a location proximate to the top and bottom end of outer supply pipe 104 as described above. In still another embodiment, the placement of a minimum of five sets of mounting blocks 110 and chamfer bars 112 are utilized at points, 114, 116, 118, 120 and 122 as illustrated in FIG. 1.

Regarding the method by which mounting blocks 110 and chamfer bars 112 are attached to the respective surfaces of the external surface inner supply pipe 102 and the interior surface of outer supply pipe 104, such method depends on the composition of supply pipes 102 and 104. In the case where supply pipes 102 and 104 are formed from a metal, metal alloy, coated metal, or a coated metal alloy, mounting blocks 110 are welded to the external surface of inner supply pipe 102 and are formed to be the appropriate height based on the concentric, or annular, space 124 between the external surface inner supply pipe 102 and the interior surface of outer supply pipe 104 (see FIG. 2). After the suitable number of sets of mounting blocks 110 are attached at various points along the external surface of inner supply pipe 102, inner supply pipe 102 is inserted into an appropriately sized outer supply pipe 104. At this point the flat ends thereof are aligned (the to ends of FIG. 1) and then the appropriate number of sets of chamfer bars 112 are installed by cutting the required number of openings through outer supply pipe 104 at the appropriate points. Next, the bottom portion of each chamfer bar 112 is welded to the external surface of inner supply pipe 102 and then the opening in outer supply pipe 104 is filled with weld metal to seal the holes in outer supply pipe 104 through which the chamfer bars 112 were inserted. In another embodiment, chamfer bars 112 are only utilized at the aligned ends of supply pipes 102 and 104 (the top ends of FIG. 1). This embodiment eliminates the need to cut holes through outer supply pipe 104 at various points such as 116, 118, 120 and 122. Accordingly, in this embodiment only mounting blocks 110 are utilized at, for example, points 116, 118, 120 and 122.

Turning to the embodiment, where supply pipes 102 and 104 are formed from a ceramic composition, the attachment of the various sets of mounting blocks 110 and chamfer bars 112 are accomplished using the method described above except that weld material is not utilized as the attachment means. Instead, an appropriate adhesive compound that is suitable for use with high temperature ceramics is utilized.

Turning to FIG. 3, FIG. 3 is a cross-sectional view of FIG. 1 from the perspective of the 3-3 line. As can be seen from FIG. 3, sleeve pipe 106 is concentrically placed around the inner supply pipe 102 an outer supply pipe 104 assembly. As is illustrated in FIG. 3, sets of four mounting blocks 126 are attached on the external surface of outer supply pipe 104 at appropriate points. For example, at points 128, 130 and 132. These points are chosen so that when lance device 100 is completely assembled point 128 will reside slightly below point at which flange 108 is attached to sleeve pipe 106, while point 132 is located at the bottom end of sleeve pipe 106 and point 130 is located at some point between points 128 and 132. As would be apparent to those of skill in the art, more than three sets of mounting blocks can be utilized to stabilize and secure sleeve pipe 106 to the assembly formed from inner pipe 102 and outer pipe 104. Although FIG. 3 illustrates a set of four mounting blocks located at 90 degree intervals, it should be noted that the present invention is not limited thereto. Rather, a set of mounting blocks 126 having three or more members can be utilized. Additionally, although FIG. 3 illustrates a 90 degree placement interval for the members of a set of mounting blocks 126, the present invention is not limited thereto and other regular, or irregular, placement intervals can be utilized.

In light of the above, it should be noted that various portions of lance device 100 are determined by the end use therefore. For example, the length of each of pipes 102, 104 and 106 are determined by the distance that lance device 100 needs to be inserted into boiler wall, casing and/or flue. Additionally, the diameters of each of pipes 102, 104 and 106 are determined depending upon the amount of powdered sorbent to be delivered to the desired point in a boiler system. Finally, the same applies to the thickness of each of walls of pipes 102, 104 and 106, as well as the concentric, or annular, spaces 124 and 134 located between the concentrically nested pipes 102, 104 and 106.

Given the above, the operation of lance device 100 will be explained. Initially, sorbent is introduced from a sorbent delivery system located at, or near, the top end (per FIG. 1) of lance device 100 of the present invention by supplying sorbent to at least the cylindrical passage 136 in inner pipe 102. In another embodiment, lance 100 and its attendant sorbent delivery system is designed to deliver sorbent to both cylindrical passage 136 of inner supply pipe 102 and to the concentric, or annular, space/passage 124 of outer pipe 104. At a desired distance from the aligned ends (the top ends in FIG. 1) of inner supply pipe 102 and outer supply pipe 104 the sorbent in either one, or both, of passages 136 and 124 enters an area where the end of inner supply pipe 102 extends beyond the end of outer supply pipe 104. As noted above, near the end portion of lance device 100 the concentric pipes are arranged such that larger diameter sections are progressively shorter than smaller diameter sections (see FIG. 1). This creates openings at various locations along the length of the lance device 100 at the bottom end (per FIG. 1) of inner supply pipe 102 and outer supply pipe 104.

Figure 4:
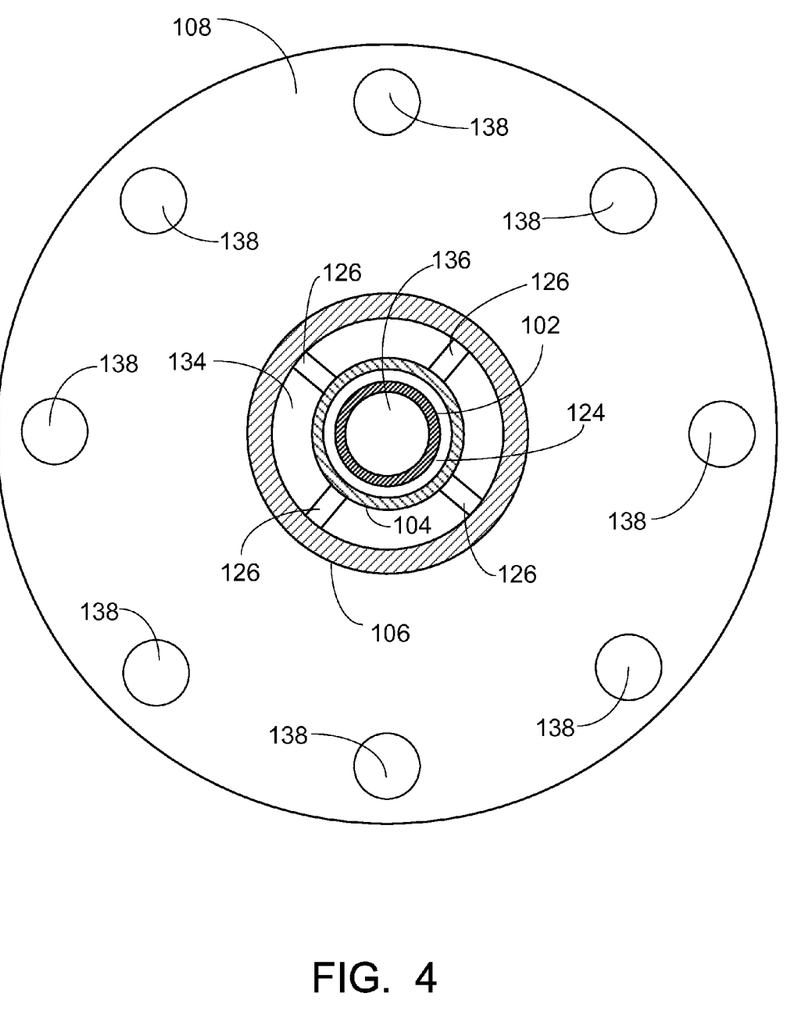
FIG. 4 is a cross-sectional view of the device of FIG. 1 from the perspective of the 4-4 line of FIG. 1.

Turning to FIG. 4, FIG. 4 is a cross-sectional view of FIG. 1 from the perspective of the 4-4 line. As can be seen from FIG. 4, sleeve pipe 106 has attached thereto flange 108. As shown in FIG. 4, flange 108 has therein eight bolt holes 138 designed to permit the attachment of lance device 100 to a desired point in a boiler wall, casing and/or flue. It should be noted that the method of attaching any lance device in accordance with the present invention is not limited to the utilization of bolts. Rather, flange 108 could be manufactured without bolt holes 108 and lance device 100 could be attached at a desired point in a boiler wall, casing and/or flue by welding it into place. As would be apparent to those of skill in the art, welding would only be possible where flange 108 is formed from metal, a metal alloy, a coated metal, or a coated metal alloy.

Figure 5:
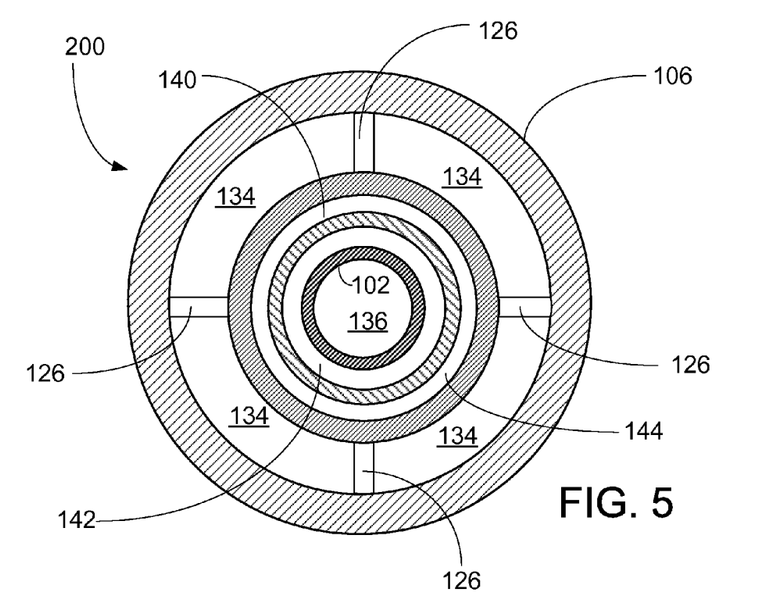
FIG. 5 is a cross-sectional view of another embodiment of the device of FIG. 1 from the perspective of the location of the 3-3 line of FIG. 1.

While FIG. 1 presents a design that features one, or even two, injection locations, the embodiment of FIG. 1 can be extended to more locations by adding any number of additional concentric pipes having varying lengths such as those of inner supply pipe 102 and outer supply pipe 104. In one embodiment, lance device 200 can be created with three concentrically nested supply pipes 102, 104 and 140. In this embodiments, as is illustrated in FIG. 5, three nested pipes are placed together to form a sorbent supply lance device 200 having an inner supply pipe 102 disposed concentrically inside a middle supply pipe 140 with these two pipes being concentrically disposed inside outer supply pipe 104. Surrounding this assembly would be sleeve pipe 106 as described above. In this embodiment, inner supply pipe 102 would be longer than middle supply pipe 140 and middle supply pipe 140 would be longer than outer supply pipe 104. Again in this embodiment, one, two and/or all three of the concentric, or annular, spaces/passages 136, 142 and 144 created by the combination of inner supply pipe 102, middle supply pipe 140 and outer supply pipe 104 would be able to deliver one or more sorbents to various points in a boiler system. As explained above, the length, size and various criteria of the pipes of this embodiment depend upon the placement of lance device 200. As such, these parameters are non-limiting features of the present invention and would be apparent to those of skill in the art upon understanding the application for which lance device 200 is to be applied.

Figure 6:
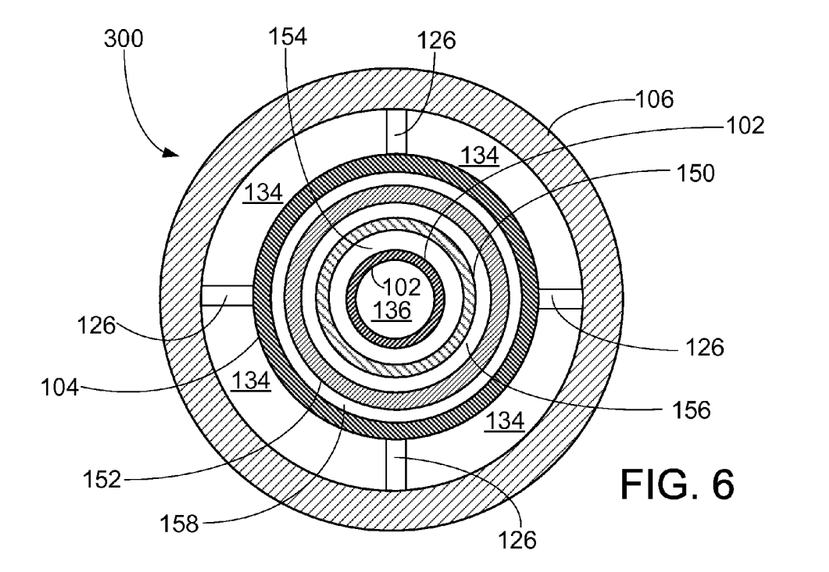
FIG. 6 is a cross-sectional view of still another embodiment of the device of FIG. 1 from the perspective of the location of the 3-3 line of FIG. 1.

Turning to FIG. 6, FIG. 6 illustrates another embodiment of lance device 100 where four concentrically nested supply pipes 102, 104, 150 and 152. In this embodiments, four nested pipes are placed together to form a sorbent supply lance device 300 having an inner supply pipe 102 disposed concentrically inside a first middle supply pipe 150, with these two pipes being concentrically disposed inside a second supply middle pipe 152, with these three pipes being concentrically disposed inside an outer supply pipe 104. Surrounding this assembly would be sleeve pipe 106 as described above. In this embodiment, inner supply pipe 102 would be longer than first middle supply pipe 142, first middle supply pipe 150 would be longer than second middle supply pipe 152, and second middle supply pipe 152 would be longer than outer supply pipe 104. Again in this embodiment, one, two, three and/or all four of the concentric, or annular, spaces/passages 136, 154, 156 and 158 created by the combination of inner supply pipe 102, first middle supply pipe 150, second middle supply pipe 152 and outer supply pipe 104 would be able to deliver one or more sorbents to various points in a boiler system. As explained above, the length, size and various criteria of the pipes of this embodiment depend upon the placement of lance device 300. As such, these parameters are non-limiting features of the present invention and would be apparent to those of skill in the art upon understanding the application for which lance device 300 is to be applied.

Although not illustrated, other embodiments where additional concentric pipes are located inside of sleeve pipe 106 are within the scope of the present invention. For example, a lance device in accordance with the present invention can have 5, 6, 7, or even 8 or more concentric pipes located inside of sleeve pipe 106. In these cases such lances would be able to inject powdered sorbent at 5, 6, 7, or even 8 or more different desired locations in a boiler system, heater system, kiln, other flue gas-, or combustion gas-, generating devices (e.g., those located at power plants, processing plants, etc.), or other similar devices.

Given the above, the present invention is, in one embodiment, directed to one or more lance devices 100, 200, or 300 that are utilized to supply at least one powdered sorbent to a two or more specific points in a boiler. As noted above, the present invention relates to the use of one or more lance devices 100, 200 and/or 300 at one or more desired locations in a boiler, heater, kiln, other flue gas-, or combustion gas-, generating devices (e.g., those located at power plants, processing plants, etc.), or other similar devices. In one embodiment, each lance device 100, 200 and/or 300 of the present invention is independently supplied with its own source of powdered sorbent. In the case where each lance device of the present invention is independently supplied with it's our source of powdered sorbent it is possible to utilize one or more different powdered sorbents. Alternatively, if so desired, the one or more lance devices of the present invention can be supplied with the same powdered sorbent. In another embodiment, the one or more lance devices of the present invention can be supplied with sorbent from one supply system that is designed to feed multiple lances simultaneously. In this embodiment, any number of lances greater than two can be driven of powdered sorbent supply system. For example, the number of lance devices that can supplied by one powdered sorbent supply system can be at least 2, at least 3, at least 4, at least 5, at least 6, at least 7, at least 8, at least 9, at least 10, at least 11, at least 12, or even 13 or more lance devices per individual powdered sorbent supply system. Here, as well as elsewhere in the specification and claims, individual numerical values, or limits, from one or more embodiments can be combined to form additional non-disclosed and/or non-stated ranges.

In light of the above, the designs of FIGS. 1 through 6 of the present invention differ from those of the prior art via the use of coaxial discharge, which enables one to inject at several locations along the length of the lance. While not being bound thereto, these embodiments enable one to realize at least two advantages: (1) by selecting specific diameters, it is possible to inject a desired and controllable amount of sorbent at a given location; and (2) by selecting specific lengths for the two or more concentric sorbent supply pipes of the present invention, the various injection points of the lance of this embodiment can be tailored to match existing gas stream flow patterns in a given location.

Figure 7:
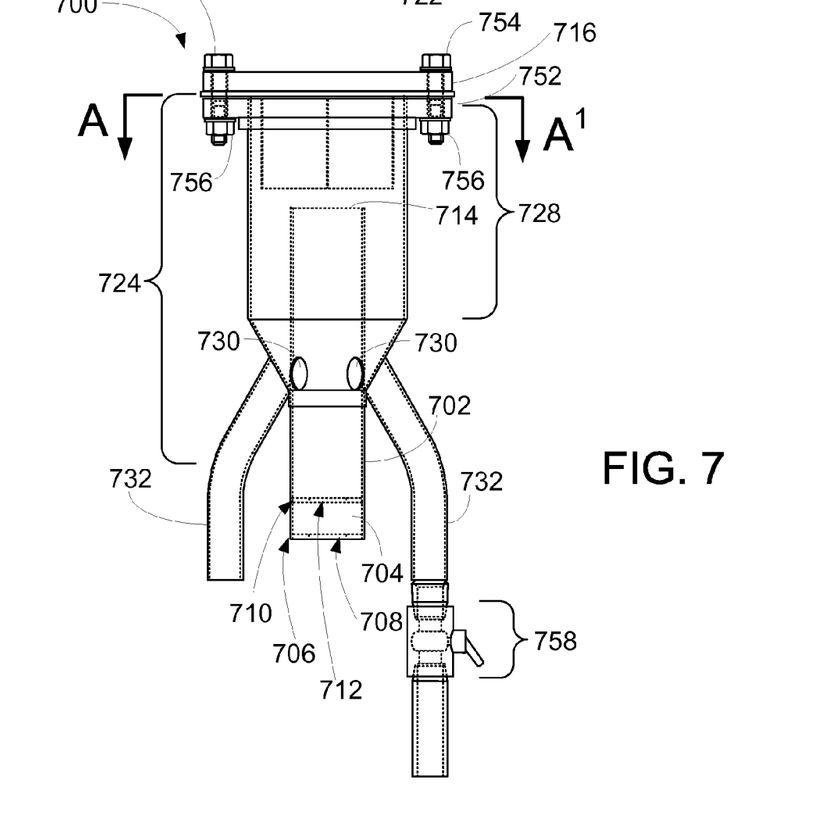
FIG. 7 is a cross sectional view of a manifold device designed to deliver a powdered compound to two or more locations for use in conjunction with the present invention.

Turning to FIGS. 7 though 9, a manifold for use in a sorbent supply system according to the present invention will now be described. Although not limited thereto, the sorbent supply system of FIGS. 7 through 9 utilizes a manifold that is fed bottom fed as will be described below.

Turning to FIG. 7, FIG. 7 illustrates a cross-sectional view of a manifold 700 designed to supply powdered compounds (e.g., powdered sorbent compounds) to two or more locations. Although manifold 700 of the present invention will be described in conjunction with the lance devices of the present invention, manifold 700 is not limited to solely this application. Rather, manifold 700 can be utilized in any situation where it is desired to deliver a powdered compound to one or more locations. Additionally, although manifold 700 will be described in conjunction with delivering a powdered compound (e.g., a powdered sorbent compound) to 6 lance devices of the present invention, manifold 700 is not limited thereto. Rather, manifold 700, as will be explained below, can be designed to deliver a powdered compound to two or more locations (in one instance two or more lance devices of the present invention). In another embodiment, manifold 700 can be designed to deliver a powdered compound to three or more locations, four or more locations, fiver or more locations, six or more locations, seven or more locations, eight or more locations, nine or more locations, ten or more locations, or even eleven or more locations. Here, as well as elsewhere in the specification and claims, individual numerical values, or limits, from one or more embodiments can be combined to form additional non-disclosed and/or non-stated ranges.

The manifold device 700 of FIG. 7 is arranged so that sorbent, conveyed by air, combustion waste gas, or any suitable inert gas (e.g., $CO_2$, flue gas, $N_2$, neon, helium, etc.) enters from the bottom via an inlet pipe 702. In order to make the distribution of the powder compound (e.g., powdered sorbent compound) more uniform an orifice 702 is created through the use of a bottom orifice ring 706 with a suitably sized opening 708 formed there through and a top orifice ring 710 with a suitably size opening 712 formed there through. It should be noted that openings 708 and 712 can be the same size or different sizes. In one embodiment, openings 708 and 712 are the same size. In another embodiment, opening 712 is larger than opening 708 so as to prevent undesired accumulation of the powdered compound in orifice 704. In still another embodiment, opening 712 is smaller than opening 708 so that powdered compound is permitted to accumulate in orifice 704 for slower delivery to main compartment of manifold 700. Sizing of orifice 704, orifice rings 706 and 710, as well as openings 708 and 712 is not critical and is varied according to the specific design criteria. As such, this embodiment of the present invention is not limited to any specific dimension of orifice 704, orifice rings 706 and 710, as well as openings 708 and 712. Although the remainder of manifold 700 will be described in relation to the delivery of a powdered sorbent, the present invention is not limited thereto. As such, any powdered compound can be delivered to any desired number of locations through the use of manifold 700 of the present invention.

At a desired distance from inlet pipe 702 powdered sorbent is discharged from the powdered sorbent discharge opening 714 of inlet pipe 702. It should again be noted that this embodiment is not limited to any one given distance. As such, this distance varies as called for by design criteria. The air/sorbent mixture forms a jet which impacts on a removable impact plate 716. Plate 716 has attached thereto and incorporates a plurality of distribution vanes 718 (i.e., two or more) which help to divide and/or segregate the powdered sorbent. It should be noted that the number of distribution vanes 718 is not critical so long as there are two or more distribution vanes 718. As for the placement of distribution vanes 718 relative to one another, such placement can be randomly dispersed, or evenly, or incrementally, dispersed, around a circular mounting assembly 722. Impact plate 716 is attached to the top portion of main body 724 of manifold 700. Main body 724 has a tapered bottom end 726 that acts as a conical discharge structure as well as mates to, and forms an air tight seal with, a desired point in the middle portion of inlet pipe 702.

Figure 8:
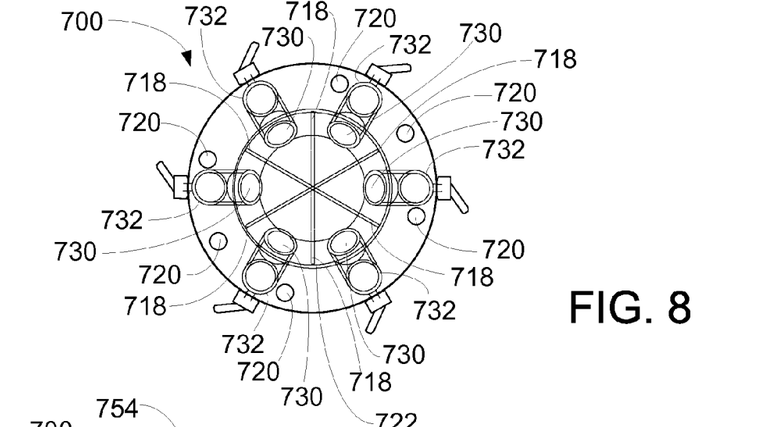
FIG. 8 is a top cross-sectional view of the manifold device of FIG. 7 along the A-A$^1$ line.
Figure 9:
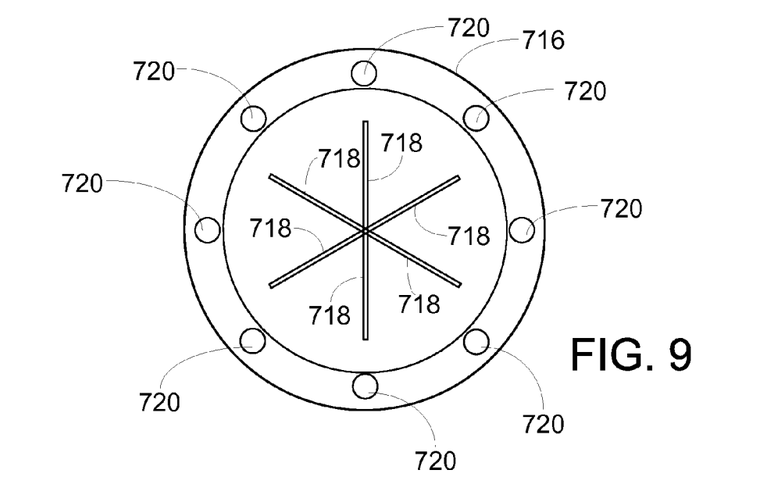
FIG. 9 is a partial top cross-sectional view of the manifold device of FIG. 7 along the A-A$^1$ line.

Regarding impact plate 716, it is attached to main body 724 with a suitable number of bolts 754 and nuts 756 (see FIGS. 7, 8 and 9) through the eight openings 720 (although only six of these openings are shown in FIG. 8 so as not to obscure other features of the present invention). The top portion of main body 724 has a corresponding flange 752 formed thereon so as to be able to mate with impact plate 716. Flange 752 has bolt holes formed there that correspond with those in impact plate 716 so as to permit the air tight assembly of impact plate 716 with main body 724 of manifold 700.

Powdered sorbent flows along impact plate 716, spreading horizontally and then is turned downward into mixing section 728. This section is sized to suit specific sorbent properties and conveying air quantities. As such, mixing section 728 is not limited to any one set of dimensions and can vary depending on various design criteria including, but not limited to, the amount of sorbent needed in a given period of time. The sorbent is conveyed vertically downward into tapered bottom end 726 (also referred to as conical discharge structure 726). The angle of tapered bottom end 726 (or conical discharge structure 726) is not limited to any one specific angle and can be tailored to promote flow of specific sorbents. Thus, any inward angle, as measured from the vertical side of mixing section 728, between about 5 degrees and about 85 degrees can be utilized. At the bottom of tapered bottom end 726 are located two or more (in the case of FIGS. 7 and 8, it is six) distribution openings 730 that are able to form air tight connections with an identical number of distribution lines 732. Each distribution line 732 can optionally contain a shut off valve 758 therein so as to permit the independent control of each distribution line 732. It should be noted that the inclusion of a shut off valve 758 in any one or more of distribution lines 732 is optional and need not be utilized should there not be a need to either shut off specific distribution lines 732, or even independently control each distribution line 732.

While FIG. 8 presents a design that features six distribution pipe openings 730 and a corresponding six distribution pipes 732, this quantity can be varied. As such, the manifold devices of the present invention are not limited to any one specific number of distribution pipe connections so long as two or more distribution pipes 732 are utilized. In one embodiment, the number of distribution pipes 732 corresponds on a one to one basis with the number of distribution vanes 718 which also correspond on a one to one basis with the number of distribution openings 730.

It should be noted that manifold 700, and its various parts, can be formed from any suitable metal, metal alloy, coated metal, coated metal alloy, or even a ceramic compound. As would be apparent to those of skill in the art, the various sub-components of manifold 700 can independently formed from different metals, metal alloys, coated metals, coated metal alloys, or even a ceramic compounds. Additionally, depending on various design criteria, various portions of manifold 700 (e.g., orifice rings 706 and 710) could be formed from suitable rubber or polymer compounds If so desired.

The proposed design differs from those of the prior art in that it is bottom fed and contains internal features to permit uniform sorbent distribution. These features include: (1) an integral orifice to promote substantially uniform distribution of sorbent; (2) an impact plate with a plurality of distribution vanes to facilitate separation of sorbent; (3) downward flow through the mixing section to maximize mixing time in a low velocity area and avoiding settling; (4) a conical discharge section designed to avoid accumulation of sorbent in the device; and (5) the ability to vary the number and size of outlet connections. While not being bound thereto, this embodiment enables one to realize at least two advantages: (1) sorbent distribution can be varied by providing different connection diameters; and (2) the device of this embodiment can be installed remotely from the flue containing the combustion gas. In another embodiment, additional internal devices can be added to mixing section 724 to promote further uniform distribution. In still another embodiment, compressed air connections can be added to prevent, mitigate or control sorbent agglomeration, if so desired. Compressed air can also be utilized to prevent, mitigate or control sorbent accumulation in the device.

Turning to FIGS. 10 through 14 of the present invention, a sorbent supply system utilizing the manifold 700 and at least two or more lance devices according to the present invention will be described.

Figure 10:
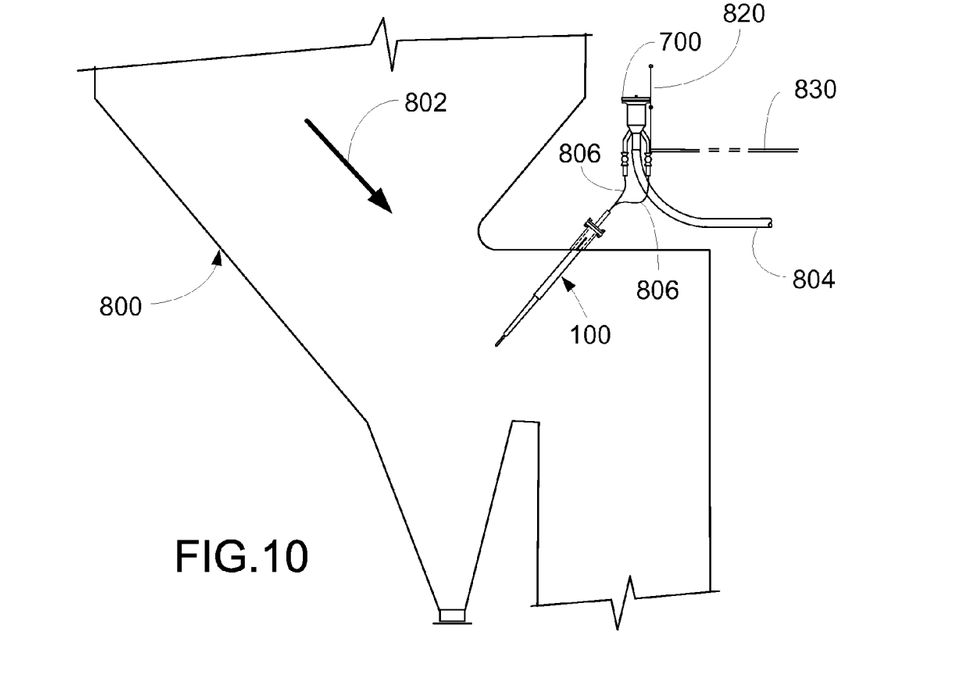
FIG. 10 is a cross-sectional view of powdered supply system according to one embodiment of the present invention that comprises two lances (only the front one is visible) being supplied a powdered compound (e.g., powdered sorbent) via a manifold according to the present invention.

FIG. 10 is a cross-sectional view of powdered supply system according to one embodiment of the present invention that comprises two lances (only the front one is visible) being supplied a powdered compound (e.g., powdered sorbent) via a manifold according to the present invention. As shown therein, any desired number of two more lance devices (e.g., lance device 100) are installed at a desired location of flue structure 800 so that when a flue gas flows thereby in the direction of arrow 802, powdered sorbent is able to be controllably injected into flue 800. In the case of the system illustrated in FIGS. 10 through 14 six lance devices 100 are shown. However, as is noted above, the present invention is not limited thereto. As can also be seen from FIG. 10 the powdered supply system according to this embodiment is supplied with powdered sorbent via a supply line 804 that is connected in an air tight manner to inlet pipe 702 of manifold 700. Each lance device 100 is connected to a single distribution pipe 732 of manifold 700 by a respective conveyance line 806 that is connected, for example, to the top (see FIG. 1) of each lance device 100.

Regarding a manner by which to control manifold 700 and therefore the two or more sorbent injection lances 100 of FIG. 10, any suitable method can be utilized. For example, each manifold 700 can be remotely controlled via an antenna 820 (see FIG. 10). Alternatively, each manifold 700 can be controlled via a wired connection 830. It should be noted that the present invention is not limited to just these two control methods. Rather, any suitable method, including manual operation by hand, can be utilized.

Figure 11:
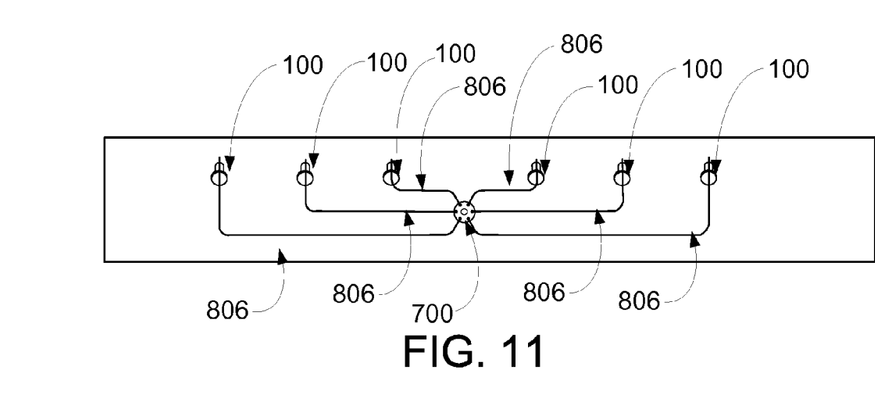
FIG. 11 is a top view of a sorbent supply system according to another embodiment of the present invention that comprises a set of six lances according to the present invention where all six lances are supplied a powdered compound (e.g., powdered sorbent) via the manifold of FIG. 7.
Figure 12:
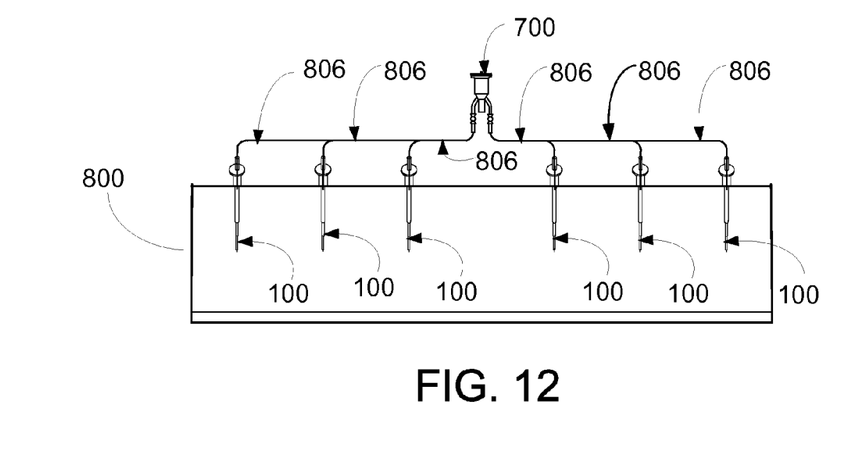
FIG. 12 is a side view of a sorbent supply system according to another embodiment of the present invention that comprises a set of six lances according to the present invention where all six lances are supplied a powdered compound (e.g., powdered sorbent) via the manifold of FIG. 7.

FIG. 11 is a top view of a sorbent supply system according to another embodiment of the present invention that comprises a set of six lances 100 according to the present invention where all six lances are supplied a powdered compound (e.g., powdered sorbent) via the manifold of FIG. 7, where like reference numerals represent like parts. FIG. 12 is a side view of a sorbent supply system according to another embodiment of the present invention that comprises a set of six lances 100 according to the present invention where all six lances are supplied a powdered compound (e.g., powdered sorbent) via the manifold of FIG. 7, where like reference numerals represent like parts. FIGS. 11 and 12 are top views and side views of the system of FIG. 10.

Figure 13:
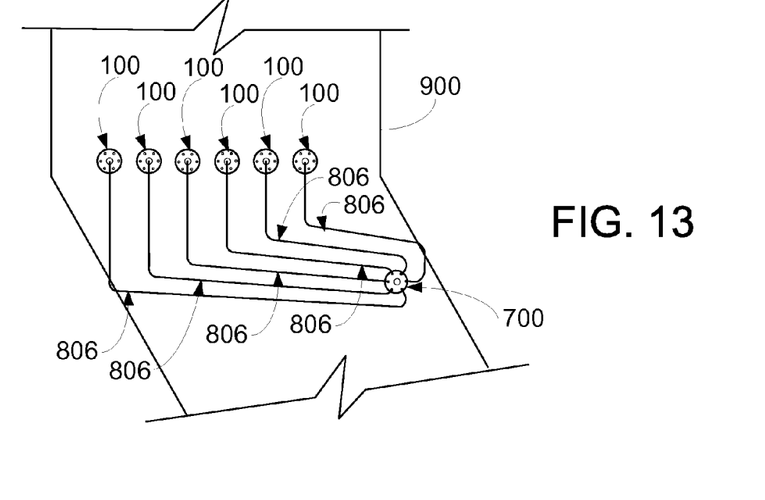
FIG. 13 is a top view of a sorbent supply system according to still another embodiment of the present invention that comprises a set of six lances according to the present invention where all six lances are supplied a powdered compound (e.g., powdered sorbent) via the manifold of FIG. 7.
Figure 14:
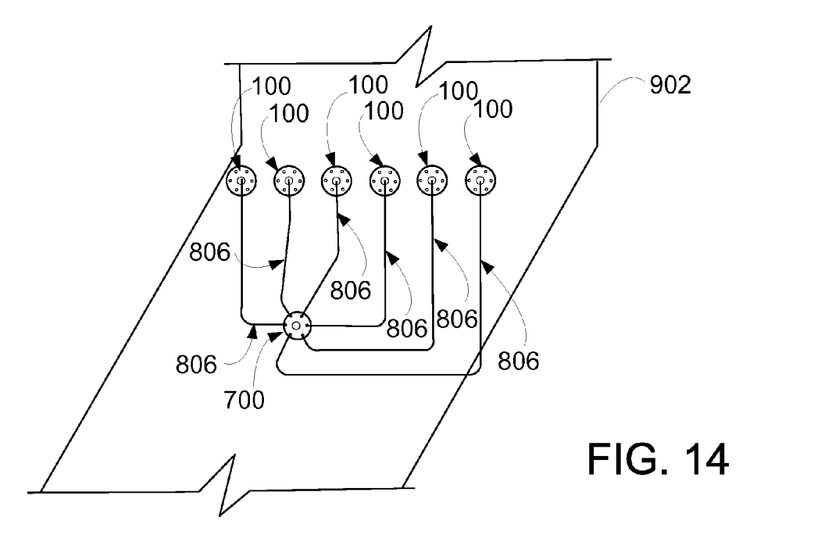
FIG. 14 is a top view of a sorbent supply system according to still yet another embodiment of the present invention that comprises a set of six lances according to the present invention where all six lances are supplied a powdered compound (e.g., powdered sorbent) via the manifold of FIG. 7.

Turning to FIGS. 13 and 14, FIG. 13 is a top view of a sorbent supply system according to still another embodiment of the present invention that comprises a set of six lances 100 according to the present invention where all six lances are supplied a powdered compound (e.g., powdered sorbent) via the manifold of FIG. 7, where like reference numerals represent like parts. FIG. 14 is a top view of a sorbent supply system according to still yet another embodiment of the present invention that comprises a set of six lances 100 according to the present invention where all six lances are supplied a powdered compound (e.g., powdered sorbent) via the manifold of FIG. 7, where like reference numerals represent like parts.

FIGS. 13 and 14 represent sorbent supply systems where manifold 700 is located in an asymmetrical fashion with respect to the two or more lance devices to be supplied therefrom. Given this, the present invention is not limited to any one orientation of manifold 700 with respect to the two or more lance devices being supplied thereby. In FIG. 13 a system according to the present invention is designed so that manifold 700 is located to the right of the lance devices supplied thereby. In FIG. 14 a system according to the present invention is designed so that manifold 700 is located to the left of the lance devices supplied thereby. In both FIGS. 13 and 14, a flue 900 and 902, respectively, may require this layout. Additionally, such a one side layout of manifold 700 can be utilized regardless of whether or not such an orientation is required for logistical reasons. Although FIGS. 13 and 14 are illustrated with six lance devices 100, these embodiments are not limited thereto. Rather, any suitable number of two or more lances according to any of the embodiments of the present invention can be utilized.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:
1. A sorbent supply system comprising:
at least one sorbent supply manifold, each sorbent supply manifold comprising:
a main body having a top and a bottom, the main body having a tapered end located at the bottom end of the main body;
an inlet pipe, the inlet pipe being connected to the tapered end of the main body;
an impact plate, the impact plate being located at the top end of the main body directly opposed to the tapered end of the main body and being designed to hold therein two or more distribution vanes;
two or more distribution openings, the distribution openings being formed in the tapered end of the main body; and
two or more distribution pipes, wherein one distribution pipe is connected in an air tight manner to a respective distribution opening,
wherein the two or more distribution vanes of the impact plate are designed to separate and distribute powdered sorbent to at least one distribution opening and wherein the two or more distribution vanes and the two or more distribution openings are arranged in a staggered fashion, and
at least two sorbent injection lance devices, each sorbent injection lance device comprising:
an inner supply pipe;
an outer supply pipe; and
a sleeve pipe, wherein the lance device has a first end where one end of both the inner supply pipe and the outer supply pipe are flat and flush with one another and a second ends of the inner supply pipe and outer supply pipe that are angled and are located opposite the flats ends, wherein the angled end of the inner supply pipe extends beyond the angled end of the outer supply pipe, wherein the sleeve pipe has two flat ends with the first flat end of the sleeve pipe being located nearest to the flat ends of the inner and outer supply pipes, the first flat end having a flange for attaching the lance device to a surface, wherein the second flat end of the sleeve pipe is located nearest to the angled ends of the inner and outer supply pipes where the outer supply pipe extends beyond the second flat end of the sleeve pipe, wherein the inner supply pipe is has a smaller diameter than the outer supply pipe, which has a smaller diameter than the sleeve pipe, wherein the inner supply pipe is concentrically located within the outer supply pipe so as to create a first annular region between the external surface of the inner supply pipe and the interior surface of the outer supply pipe, wherein the outer supply pipe is concentrically located within the sleeve pipe so as to create a second annular region between the external surface of the outer supply pipe and the interior surface of the sleeve pipe, wherein at least one of the first or second annular regions are supplied with a powder sorbent, and wherein each of the at least two sorbent injection lance devices are in communication with one distribution opening in the at least one sorbent supply manifold.

2. The sorbent supply system of claim 1, wherein the at least one sorbent supply manifold has three or more distribution vanes, three or more distribution openings and three or more distribution pipes, wherein each distribution pipe is connected in an air tight manner to a respective distribution opening.

3. The sorbent supply system of claim 2, wherein the three or more distribution vanes are dispersed at even intervals around a circle.

4. The sorbent supply system of claim 2, wherein the three or more distribution vanes are dispersed at irregular intervals around a circle.

5. The sorbent supply system of claim 1, wherein the at least one sorbent supply manifold has four or more distribution vanes, four or more distribution openings and four or more distribution pipes, wherein each distribution pipe is connected in an air tight manner to a respective distribution opening.

6. The sorbent supply system of claim 5, wherein the four or more distribution vanes are dispersed at even intervals around a circle.

7. The sorbent supply system of claim 5, wherein the four or more distribution vanes are dispersed at irregular intervals around a circle.

8. The sorbent supply system of claim 1, wherein the at least one sorbent supply manifold has five or more distribution vanes, five or more distribution openings and five or more distribution pipes, wherein each distribution pipe is connected in an air tight manner to a respective distribution opening.

9. The sorbent supply system of claim 8, wherein the five or more distribution vanes are dispersed at even intervals around a circle.

10. The sorbent supply system of claim 8, wherein the five or more distribution vanes are dispersed at irregular intervals around a circle.

11. The sorbent supply system of claim 1, wherein the at least one sorbent supply manifold has six or more distribution vanes, six or more distribution openings and six or more distribution pipes, wherein each distribution pipe is connected in an air tight manner to a respective distribution opening.

12. The sorbent supply system of claim 11, wherein the six or more distribution vanes are dispersed at even intervals around a circle.

13. The sorbent supply system of claim 11, wherein the six or more distribution vanes are dispersed at irregular intervals around a circle.

14. The sorbent supply system of claim 1, wherein each sorbent injection lance device further comprises at least one middle supply pipe each of the middle supply pipes having different diameters and being concentrically located between the inner supply pipe and the outer supply pipe, wherein all of the middle supply pipes have a first end that is flat and aligned with the flat ends of the outer supply pipe and the inner supply pipe and an angled second end such that the second ends of the inner supply pipe, the middle supply pipes and the outer supply pipe become progressively shorter from the inner supply pipe to the outer supply pipe.

15. A sorbent supply manifold comprising:
    a main body having a top and a bottom, the main body having a tapered end located at the bottom end of the main body;
    an inlet pipe, the inlet pipe being connected to the tapered end of the main body;
    an impact plate, the impact plate being located at the top end of the main body directly opposed to the tapered end of the main body and being designed to hold therein two or more distribution vanes;
    two or more distribution openings, the distribution openings being formed in the tapered end of the main body; and
    two or more distribution pipes, wherein one distribution pipe is connected in an air tight manner to a respective distribution opening,
    wherein the two or more distribution vanes of the impact plate are designed to separate and distribute powdered sorbent to at least one distribution opening, and
    wherein the two or more distribution vanes and the two or more distribution openings are arranged in a staggered fashion.

16. The sorbent supply manifold of claim 15, wherein the at least one sorbent supply manifold has three or more distribution vanes, three or more distribution openings and three or more distribution pipes, wherein each distribution pipe is connected in an air tight manner to a respective distribution opening.

17. The sorbent supply manifold of claim 16, wherein the three or more distribution vanes are dispersed at even intervals around a circle.

18. The sorbent supply manifold of claim 16, wherein the three or more distribution vanes are dispersed at irregular intervals around a circle.

19. The sorbent supply manifold of claim 15, wherein the at least one sorbent supply manifold has four or more distribution vanes, four or more distribution openings and four or more distribution pipes, wherein each distribution pipe is connected in an air tight manner to a respective distribution opening.

20. The sorbent supply manifold of claim 19, wherein the four or more distribution vanes are dispersed at even intervals around a circle.

21. The sorbent supply manifold of claim 19, wherein the four or more distribution vanes are dispersed at irregular intervals around a circle.

22. The sorbent supply manifold of claim 15, wherein the at least one sorbent supply manifold has five or more distribution vanes, five or more distribution openings and five or more distribution pipes, wherein each distribution pipe is connected in an air tight manner to a respective distribution opening.

23. The sorbent supply manifold of claim 22, wherein the five or more distribution vanes are dispersed at even intervals around a circle.

24. The sorbent supply manifold of claim 22, wherein the five or more distribution vanes are dispersed at irregular intervals around a circle.

25. The sorbent supply manifold of claim 15, wherein the at least one sorbent supply manifold has six or more distribution vanes, six or more distribution openings and six or more distribution pipes, wherein each distribution pipe is connected in an air tight manner to a respective distribution opening.

26. The sorbent supply manifold of claim 25, wherein the six or more distribution vanes are dispersed at even intervals around a circle.

27. The sorbent supply manifold of claim 25, wherein the six or more distribution vanes are dispersed at irregular intervals around a circle.

28. A sorbent injection lance comprising:
an inner supply pipe;
an outer supply pipe; and
a sleeve pipe,
wherein the lance device has a first end where one end of both the inner supply pipe and the outer supply pipe are flat and flush with one another and a second ends of the inner supply pipe and outer supply pipe that are angled and are located opposite the flats ends,
wherein the angled end of the inner supply pipe extends beyond the angled end of the outer supply pipe,
wherein the sleeve pipe has two flat ends with the first flat end of the sleeve pipe being located nearest to the flat ends of the inner and outer supply pipes, the first flat end having a flange for attaching the lance device to a surface,
wherein the second flat end of the sleeve pipe is located nearest to the angled ends of the inner and outer supply pipes where the outer supply pipe extends beyond the second flat end of the sleeve pipe,
wherein the inner supply pipe is has a smaller diameter than the outer supply pipe, which has a smaller diameter than the sleeve pipe,
wherein the inner supply pipe is concentrically located within the outer supply pipe so as to create a first annular region between the external surface of the inner supply pipe and the interior surface of the outer supply pipe,
wherein the outer supply pipe is concentrically located within the sleeve pipe so as to create a second annular region between the external surface of the outer supply pipe and the interior surface of the sleeve pipe, and
wherein at least one of the first or second annular regions are suitable for being supplied with a powder sorbent.

29. The sorbent injection lance of claim 28, further comprising at least one middle supply pipe each of the middle supply pipes having different diameters and being concentrically located between the inner supply pipe and the outer supply pipe, wherein all of the middle supply pipes have a first end that is flat and aligned with the flat ends of the outer supply pipe and the inner supply pipe and an angled second end such that the second ends of the inner supply pipe, the middle supply pipes and the outer supply pipe become progressively shorter from the inner supply pipe to the outer supply pipe.

30. A method of supplying a powdered sorbent to a boiler system, the method comprising the steps of:
(A) supplying at least one sorbent supply manifold, each sorbent supply manifold comprising: a main body having a top and a bottom, the main body having a tapered end located at the bottom end of the main body; an inlet pipe, the inlet pipe being connected to the tapered end of the main body; an impact plate, the impact plate being located at the top end of the main body directly opposed to the tapered end of the main body and being designed to hold therein two or more distribution vanes; two or more distribution openings, the distribution openings being formed in the tapered end of the main body; and two or more distribution pipes, wherein one distribution pipe is connected in an air tight manner to a respective distribution opening, wherein the two or more distribution vanes of the impact plate are designed to separate and distribute powdered sorbent to at least one distribution opening and wherein the two or more distribution vanes and the two or more distribution openings are arranged in a staggered fashion;
(B) supplying at least two sorbent injection lance devices, each sorbent injection lance device comprising: an inner supply pipe; an outer supply pipe; and a sleeve pipe, wherein the lance device has a first end where one end of both the inner supply pipe and the outer supply pipe are flat and flush with one another and a second ends of the inner supply pipe and outer supply pipe that are angled and are located opposite the flats ends, wherein the angled end of the inner supply pipe extends beyond the angled end of the outer supply pipe, wherein the sleeve pipe has two flat ends with the first flat end of the sleeve pipe being located nearest to the flat ends of the inner and outer supply pipes, the first flat end having a flange for attaching the lance device to a surface, wherein the second flat end of the sleeve pipe is located nearest to the angled ends of the inner and outer supply pipes where the outer supply pipe extends beyond the second flat end of the sleeve pipe, wherein the inner supply pipe is has a smaller diameter than the outer supply pipe, which has a smaller diameter than the sleeve pipe, wherein the inner supply pipe is concentrically located within the outer supply pipe so as to create a first annular region between the external surface of the inner supply pipe and the interior surface of the outer supply pipe, wherein the outer supply pipe is concentrically located within the sleeve pipe so as to create a second annular region between the external surface of the outer supply pipe and the interior surface of the sleeve pipe, wherein at least one of the first or second annular regions are supplied with a powder sorbent, and wherein the at least two sorbent injection lance devices are located in at an appropriate point in a boiler system such that the angled ends of the sorbent injection lance devices can supply at least one sorbent to a desired internal portion of the boiler system;
(C) connecting the at least one sorbent supply manifold to the at least two sorbent injection lance devices, wherein each of the at least two sorbent injection lance devices are in communication with one distribution opening in the at least one sorbent supply manifold; and (D) supplying at least one powdered sorbent material to the at least one sorbent supply manifold such that the at least one sorbent supply manifold can supply at least one powdered sorbent to the at least two sorbent supply lance devices which in turn supply the at least one powdered sorbent to a desired internal portion of the boiler system.

31. The method of claim 30, wherein the powdered sorbent is powdered activated carbon.

* * * * *